United States Patent [19]

Kronenberg

[11] 4,048,402
[45] Sept. 13, 1977

[54] NON-AQUEOUS CELL HAVING A CATHODE OF LEAD MONOXIDE-COATED LEAD DIOXIDE PARTICLES

[75] Inventor: Marvin Lee Kronenberg, Cleveland Heights, Ohio

[73] Assignee: Union Carbide Corporation, New York, N.Y.

[21] Appl. No.: 754,531

[22] Filed: Dec. 27, 1976

[51] Int. Cl.² .......................................... H01M 6/14
[52] U.S. Cl. .................................... 429/194; 429/228
[58] Field of Search ............................ 429/194–197, 429/228, 218

[56] References Cited

U.S. PATENT DOCUMENTS 3,877,983  4/1975  Hovsepian ........................... 429/194
3,907,597  9/1975  Mellors ............................ 429/228 X Primary Examiner—C. F. LeFevour
Attorney, Agent, or Firm—Cornelius F. O'Brien

[57] ABSTRACT

A non-aqueous lead oxide cell having a negative electrode, such as lithium, a non-aqueous electrolyte and a positive lead oxide electrode, said lead oxide electrode comprising lead dioxide particles each having an outer layer of lead monoxide.

10 Claims, 4 Drawing Figures

NON-AQUEOUS CELL HAVING A CATHODE OF LEAD MONOXIDE-COATED LEAD DIOXIDE PARTICLES

FIELD OF THE INVENTION

The invention relates to non-aqueous lead oxide cells, and specifically to such cells wherein the positive electrode comprises lead dioxide particles having an outer layer of lead monoxide.

BACKGROUND OF THE INVENTION

The development of high energy cell systems requires the compatibility of an electrolyte possessing desirable electrochemical properties with highly active anode materials, such as lithium, calcium, sodium and the like, and the efficient use of high energy density cathode materials, such as $FeS_2$, $Co_3O_4$, $PbO_2$ and the like. The use of aqueous electrolytes is precluded in these systems since the anode materials are sufficiently active to react with water chemically. Therefore, in order to realize the high energy density obtainable through use of these highly reactive anodes and high energy density cathodes, it is necessary to use a non-aqueous electrolyte system.

One of the major disadvantages of employing lead dioxide as the active cathode material in a non-aqueous electrolyte system is that it will discharge at two different potentials. The first step in the discharge curve is attributed to the reduction of the lead dioxide to lead monoxide, while the second step is attributed to the reduction of the reaction product lead monoxide. Contrary to lead dioxide, lead monoxide will discharge in a non-aqueous cell system at a unipotential level. One advantage in employing a lead dioxide as the cathode material over lead monoxide is that it has almost double the capacity of lead monoxide. Thus in a non-aqueous electrolyte system, lead monoxide will have the advantage of discharging at a unipotential plateau with the disadvantage of having a relatively low capacity while lead dioxide will have the advantage of having a relatively high capacity with the disadvantage of discharging at two distinct voltage plateaus.

Many cell or battery applications, particularly in transistorized devices such as hearing aids, watches and the like, require a substantial unipotential discharge source for proper operation and, therefore, cannot use the dual voltage level discharge which is characteristic of non-aqueous lead dioxide cells. This dual voltage level discharge characteristic is similar to the dual voltage discharge characteristic of aqueous alkaline divalent silver oxide cells. Although many approaches have been proposed for obtaining a unipotential discharge from an aqueous alkaline divalent silver oxide cell, the approaches are not needed when lead dioxide is employed in an aqueous electrolyte cell system. Specifically, in an aqueous electrolyte cell system, lead dioxide will discharge almost entirely at its higher voltage level so that, in effect, the cell will produce a substantially unipotential discharge over the useful life of the cell. Contrary to this, when lead dioxide is used as the cathode material in a non-aqueous electrolyte system, the cell will discharge at a first potential for a significant time period and then decrease to a distinct lower potential for the remainder of the discharge. A problem usually encountered in various cell systems is that although an electrode-couple can function in an aqueous electrolyte, it is practically impossible to predict in advance how well, if at all, it will function in a non-aqueous electrolyte. Thus a cell must be considered as a unit having three parts — a cathode, an anode and an electrolyte — and it is to be understood that the parts of one cell may not be predictably interchangeable with parts of another cell to produce an efficient and workable cell.

A French Pat. No. 2,288,401 published on June 18, 1976 (counterpart to German application No. 2,545,498 published on Apr. 27, 1976) discloses a non-aqueous cell which employs a negative electrode, such as lithium, a non-aqueous-solvent electrolyte and a positive active electrode consisting of a positive active material of the oxides and oxidizing salts, the discharged reduction of which leads to metals of the group including lead, tin, gold, bismuth, zinc, cadmium and their alloys and an electronic conductor consisting at least on the surface of a material selected from the group including lead, tin, gold, bismuth, zinc, cadmium and their alloys. Several examples are disclosed in this reference in which lead monoxide is employed as the positive active material and lead, tin or graphite is employed as the electronic conductor. Although this reference teaches one means for obtaining a unipotential discharge for certain non-aqueous cell systems, as, for example, a cell employing lead monoxide as the positive active material, the subject invention is directed to the use of lead dioxide particles having a lead monoxide outer layer as the positive active material of a non-aqueous cell. The positive active material of this invention could also be expressed as lead monoxide particles having a lead dioxide core.

Accordingly, it is the primary object of this invention to provide a non-aqueous lead oxide cell which employs a positive electrode comprising lead dioxide particles each having a lead monoxide outer layer, and which has a substantially unipotential discharge voltage.

Another object of this invention is to provide a non-aqueous lead oxide cell which employs a lithium anode and a positive cathode composed of lead dioxide particles each having a lead monoxide outer layer, and which has a substantially unipotential discharge voltage.

Another object of this invention is to provide a non-aqueous lead oxide cell which employs a positive electrode composed of lead dioxide particles each having a lead monoxide outer layer, and wherein said lead monoxide varies between about 1 percent and 60 percent by weight of the lead oxides.

SUMMARY OF THE INVENTION

The invention relates to a non-aqueous lead oxide cell comprising a highly active metal negative electrode, a positive electrode and a non-aqueous electrolyte; said positive electrode comprising lead dioxide particles each having a substantially complete outer layer of lead monoxide, and said cell having a substantially unipotential discharge voltage.

A unipotential discharge voltage shall mean a relatively constant voltage level extending over at least 85 percent of a cell's discharge capacity when discharged across a fixed load, and wherein the voltage varies no more than ± 10 percent of the average voltage of said voltage level. For example, a unipotential discharge level can be represented by a voltage-time curve substantially free from voltage excursions or steps during at least 85 percent of the time of discharge across a constant load, such steps or excursions being defined as voltage readings outside of ± 10 percent of the average voltage over the said 85 percent portion of the time of discharge. As shown in FIG. 1, it is the object of this invention to effectively eliminate or effectively suppress the portion of the curve to the left of point A to yield a unipotential discharge level as generally shown by the curve between points A and B.

It is also within the scope of this invention to add a binder, an electronically conductive material, an electrolyte-absorbent material or mixtures thereof to the positive electrode of this invention.

The size of the lead monoxide-coated lead dioxide particles comprising the cathode of this invention should preferably be between about 0.04 mm and about 0.47 mm and more preferably between about 0.07 mm and about 0.23 mm. Particles sized smaller than about 0.04 mm will provide a large true surface area but, however when fabriated into a cathode, the electronic conductivity of the cathode will generally be insufficient for commercial cell application due to the large number of particle-to-particle contacts providing the conductive path through the cathode to the cathode collector of the cell. A cathode fabricated with lead monoxide-coated lead dioxide particles sized larger than about 0.47 mm will have a small true surface area which will generally not support a current density generally required for commercial cell application.

The percent by weight of lead monoxide in the lead dioxide-cont aining positive electrode of this invention should be between about 1 percent and about 60 percent based on the weight of the lead oxides and preferably between about 10 percent and about 40 percent based on the weight of the lead oxides. A lead monoxide amount less than about 1 percent by weight of the lead dioxides would be insufficient to reliably and substantially eliminate the two voltage plateau discharge characteristic of lead dioxide in a non-aqueous electrolyte cell system. An amount of lead monoxide greater than about 60 percent by weight of the lead oxides would be inefficient since too much of the high capacity lead dioxide material would be replaced by the lower capacity lad monoxide material.

Useful highly active negative anode materials are generally consumable metals and include aluminum, the alkali metals, alkaline earth metals and alloys of alkali metals or alkaline earth metals with each other and other metals. The term "alloy" as used herein and in the appended claims is intended to include mixtures, solid solutiins, such as lithium-magnesium, and intermetallic compounds such as lithium monoaluminide. The preferred anode materials are lithium, sodium, potassium, calcium, and alloys thereof.

Useful organic solvents employed alone or mixed with one or more other solvents for use in this invention include the following classes of compounds:

Alkylene nitriles: e.g., crotonitrile (liquid range −51.1° to 120° C.)
Trialkyl borates: e.g., trimethyl borate, $(CH_3O)_3B$ (liquid range −29.3° to 67° C.)
Tetraalkyl silicates: e.g., tetramethyl silicate, $(CH_3O)_4Si$ (boiling point 121° C.)
Nitroalkanes: e.g. nitromethane, $CH_3NO_2$ (liquid range −17° to 100.8° C.)
Alkylnitriles: e.g., acetonitrile, $CH_3CN$ (liquid range −45° to 81.6° C.)
Dialkylamides: e.g., dimethylformamide, $HCON(CH_3)_2$ (liquid range −60.48° to 149° C.)
Lactams: e.g., N-methylpyrrolidone,

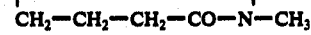

(liquid range −16° to 202° C.)
Tetraalkylureas: e.g., tetramethylurea, $(CH_3)_2N$—CO—$N(CH_3)_2$ (liquid range −1.2° to 166° C.)
Monocarboxylic acid esters: e.g., ethyl acetate (liquid range −83.6° to 77.06° C.)
Orthoesters: e.g., trimethylorthoformate, $HC(OCH_3)_3$ (boiling point 103° C.)
Lactones: e.g., γ-(gamma) butyrolactone,

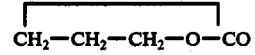

(liquid range −42° to 206° C.)
Dialkyl carbonates: e.g., dimethyl carbonate, $OC(OCH_3)_2$ (liquid range 2° to 90° C.)
Alkylene carbonates: e.g., propylene carbonate,

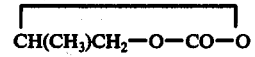

(liquid range −48° to 242° C.)
Monoethers: e.g., diethyl ether (liquid range −116° to 34.5° C.)
Polyethers: e.g., 1,1- and 1,2-dimethoxyethane (liquid ranges −113.2° to 64.5° C. and −58° to 83° C., respectively)
Cyclic ethers: e.g., tetrahydrofuran (liquid range −65° to 67° C.); 1,3-dioxolane (liquid range −95° to 78° C.)
Nitroaromatics: e.g., nitrobenzene (liquid range 5.7° to 210.8° C.)
Aromatic carboxlic acid halides: e.g., benzoyl chloride (liquid range 0 to 197° C.); benzoyl bromide (liquid range −24° to 218° C.)
Aromatic sulfonic acid halides; e.g., benzene sulfonyl chloride (liquid range 14.5° to 251° C.)
Aromatic phosphonic acid dihalides: e.g., benzene phosphonyl dichloride (boiling point 258° C.)
Aromatic thiophosphonic acid dihalides: e.g., benzene thiophosphonyl dichloride (boiling point 124° C. at 5 mm.)
Cyclic sulfones: e.g., sulfolane,

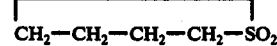

(melting point 22° C.); 3-methylsulfolane (melting point −1° C.)
Alkyl sulfonic acid halies: e.g., methanesulfonyl chloride (boiling point 161° C.)
Alkyl carboxylic acid halides: e.g., acetyl chloride (liquid range −112° to 50.9° C.); acetyl bromide (liquid range −96° to 76° C.); propionyl chloride (liquid range −94° to 80° C.)
Saturated heterocyclics: e.g., tetrahydrothiophene (liquid range −96° to 121° C.); 3-methyl-2-oxazolidone (melting point 15.9° C.)
Dialkyl sulfamic acid halides: e.g., dimethyl sulfamyl chloride (boiling point 80° C. at 16 mm.)
Alkyl halosulfonates: e.g., ethyl chlorosulfonate (boiling point 151° C.)

Unsaturated heterocyclic carboxylic acid halides: e.g., 2-furoyl chloride (liquid range −2° to 173° C.)

Five-membered unsaturated heterocyclics: e.g., 3,5-dimethylisoxazole (boiling point 140° C.); 1-methylpyrrole (boiling point 114° C.); 2,4-dimethylthiazole (boiling point 144° C.); furan (liquid range −85.65° to 31.36° C.)

Esters and/or halides of dibasic carboxylic acids: e.g., ethyl oxalyl chloride (boiling point 135° C.)

Mixed alkyl sulfonic acid halides and carboxylic acid halides: e.g., chlorosulfonyl acetyl chloride (boiling point 98° C. at 10 mm.)

Dialkyl sulfoxides: e.g., dimethyl sulfoxide (liquid range 18.4° to 189° C.)

Dialkyl sulfates: e.g., dimethylsulfate (liquid range −31.75° to 188.5° C.)

Dialkyl sulfites: e.g., dimethylsulfite (boiling point 126° C.)

Alkylene sulfites: e.g., ethylene glycol sulfite (liquid range −11° to 173° C.)

Halogenated alkanes: e.g., methylene chloride (liquid range −95° to 40° C.); 1,3-dichloropropane (liquid range −99.5° to 120.4° C.)

Of the above, the preferred solvents are sulfolane; crotonitrile; nitrobenzene; tetrahydrofuran; 1,3-dioxolane; 3-methyl-2-oxazolidone; propylene carbonate; γ-butyrolactone; ethylene glycol sulfite; dimethylsulfite; dimethyl sulfoxide; and 1,1- and 1,2-dimethoxyethane. Of the preferred solvents, the best are sulfolane; 3-methyl-2-oxazolidone; propylene carbonate 1,3-dioxolane and dimethoxyethane because they appear more chemically inert to battery components and have wide liquid ranges, and especially because they permit highly efficient utilization of the cathode materials.

The ionizing solute for use in the invention may be a simple or double salt, or mixtures thereof, which will produce an ionically conductive solution when dissolved in one or more solvents. Preferred solutes are complexes of inoganic or organic Lewis acids and inorganic ionizable salts. The only requirements for utility are that the salts, whether simple or complex, be compatible with the solvent or solvents being employed and that they yield a solution which is sufficiently ionically conductive. According to the Lewis or electronic concept of acids and bases, many substances which contain no active hydrogen can act as acids or acceptors of electron doublets. The basic concept is set forth in the chemical literature (Journal of the Franklin Institute, Vol. 226 — July/December 1938, pages 293-313 by Lewis).

A suggested reaction mechanism for the manner in which these complexes function in a solvent is described in detail in U.S. Pat. No. 3,542,602 wherein it is suggested that the complex or double salt formed between the Lewis acid and the ionizable salt yields an entity which is more stable than either of the components alone.

Typical Lewis acids suitable for use in the present invention include aluminum fluoride, aluminum bromide, aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

It will be obvious to those skilled in the art that the double salts formed by a Lewis acid and an inorganic ionizable salt may be used as such or the individual components may be added to the solvent separately to form the double salt or the resulting ions in situ. One such double salt, for example, is that formed by the combination of aluminum chloride and lithium chloride to yield lithium aluminum tetrachloride

EXAMPLE I

A flat-type cell was constructed utilizing a nickel metal base having therein a 1-inch diameter shallow depression into which the cell contents were placed and over which a nickel metal cap was placed to close the cell. The contents of the cell consisted of five sheets of lithium foil having a total thickness of 0.10 inch, about 4 ml of an electrolyte, two porous nonwoven polypropylene separators (0.005 inch thick each) which absorbed some of the electrolyte, and a lead dioxide cathode mix.

The electrolyte was a 1M $LiClO_4$ in 77 volume percent dioxolane, 23 volume percent dimethoxyethane (DME) with a trace of about 0.1 volume percent dimethyl isoxazole (DMI) as a polymerization inhibitor. The cathode was a pressed layer of 4.3 grams of lead dioxide.

Figure 1:
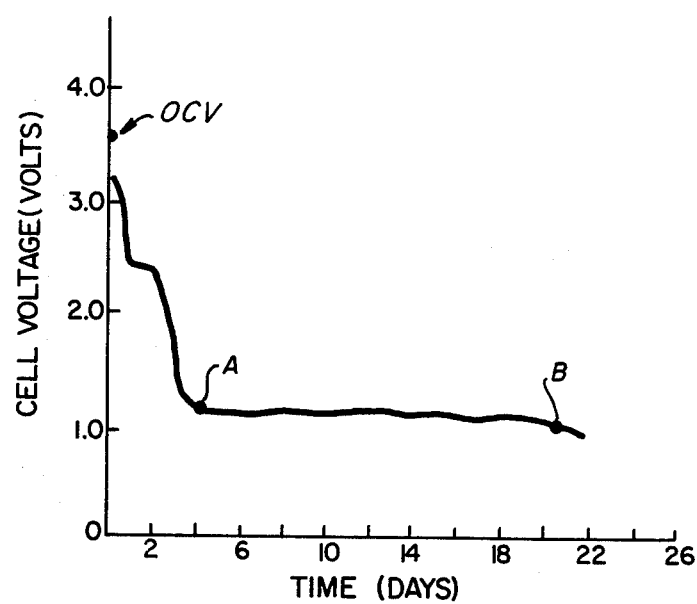
FIG. 1 is a curve showing the discharge characteristics of a non-aqueous lead oxide-lithium cell employing a lead dioxide positive electrode (cathode).

The cell was discharged across a constant load at a 3-milliampere drain and the voltage observed as a function of time is shown plotted as the curve on the graph in FIG. 1. Also observed and as recorded on FIG. 1 is the open circuit voltage of the cell which was 3.5 volts. As is apparent from the curve in FIG. 1, it took approximately 4 days before the voltage decreased to a substantially unipotential level of approximately 1.2 volts. As stated above, may cell and battery operated devices which require an essentially unipotential power source could not use this type of cell system because of its significant dual voltage level discharge characteristic.

EXAMPLE II

A flat-type cell was constructed using the same components as described in Example I except that the cathode mix was a compressed layer of a mixture of 3 grams of lead monoxide and 0.5 gram of carbon black added for conductivity. As in Example I, the cathode mix was placed into the shallow depression in a nickel metal base along with other cell components.

Figure 2:
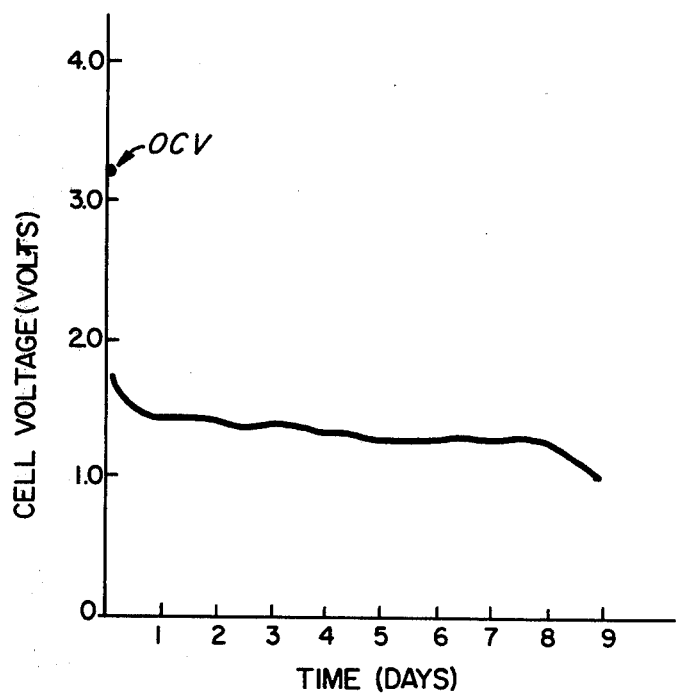
FIG. 2 is a curve showing the discharge characteristics of a non-aqueous lead oxide-lithium cell employing a lead monoxide positive electrode

The cell was discharged on a 3-milliampere drain and the voltage observed as a function of time is shown plotted as the curve on the graph in FIG. 2. Also observed and as recorded on FIG. 2 is the open circuit voltage of the cell which was about 3.2 volts. This high open circuit voltage for the cell is believed to be due to the presence of oxygen and/or oxides on the surface of the carbon black in the cathode mix.

As is apparent from the curve in FIG. 2, the substantially unipotential voltage level output of this cell makes it an admirable candidate as a power source for many cell and battery operated devices. As stated above however, although this type of cell has the advantage of discharging at a substantially unipotential level, it has the disadvantage of having a rather low capacity as compared to a cell employing lead dioxide as the cathode material.

EXAMPLE III

A flat-type cell was constructed using the same components as described in Example I except that the cathode was composed of lead monoxide-coated lead dioxide particles which were prepared in the following manner:

6 grams of reagent grade $PbO_2$ were mixed with 900 milliliters of an aqueous 0.0015 M hydrazine ($N_2H_4$) solution and stirred for one-half hour. The mixture was then filtered and the treated $PbO_2$ was dried overnight in a vacuum oven at approximately 82° C. This reduced the $PbO_2$ capacity by about 30% producing lead monoxide coated lead dioxide particles. Two grams of the partially reduced $PbO_2$ particles were placed into the shallow depression in a nickel metal base along with the other cell components as described in Example I. To vary the reduction of $PbO_2$ capacity all that is necessary is to vary the amount and/or concentration of the hydrazine solution and, if desired, the time and/or temperature of the reaction.

Figure 3:
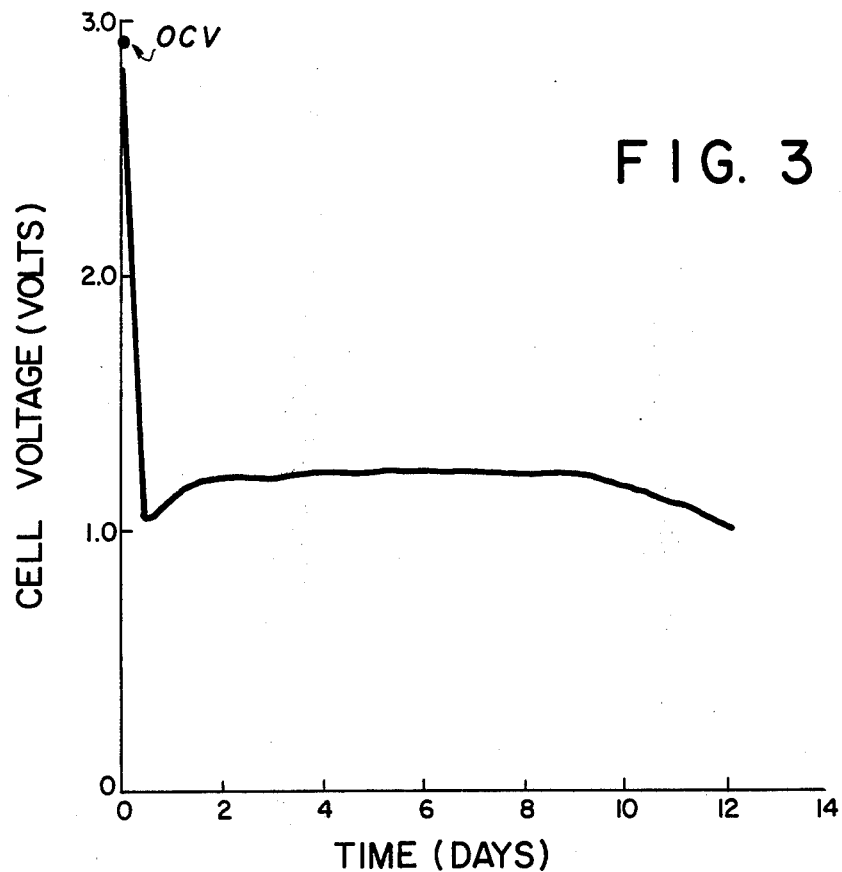
FIG. 3 is a curve showing the discharge characteristics of a non-aqueous lead oxide-lithium cell employing a positive electrode composed of lead monoxide-coated lead dioxide particles in accordance with the present invention.

The cell so produced in accordance with this invention was then discharged across a 1K-ohm load (about 1.2-milliampere drain) and the voltage observed as a function of time is shown plotted as the curve on the graph in FIG. 3. Also observed and as recorded on FIG. 3 is the open circuit voltage of the cell which was about 2.95 volts.

As is apparent from the curve in FIG. 3, the cell discharged at a substantially unipotential level almost immediately, even at this lower current drain, and then continued at the lead monoxide-lithium voltage level for more than 11 days. Thus using the teachings of this invention, a non-aqueous lead dioxide cell can be made which takes advantage of the high capacity characteristic of lead dioxide while simultaneously effectively eliminating the disadvantage of the dual voltage level output characteristic of lead dioxide in a non-aqueous cell system.

EXAMPLE IV

A flat-type cell was constructed using the same components as described in Example I except that the cathode was composed of 1.5 grams of lead dioxide particles sized between 0.07 mm and 0.15 mm and the electrolyte was 1M $LiCF_3SO_3$ and 0.5M hydrazine in 40 volume percent dioxolane, 30 volume percent dimethoxyethane and 30 volume percent 3-methyl-2-oxazolidone. As in Example III, the surface of the lead dioxide particles contacted by the hydrazine was reduced thereby forming a lead monoxide layer on said particles.

Figure 4:
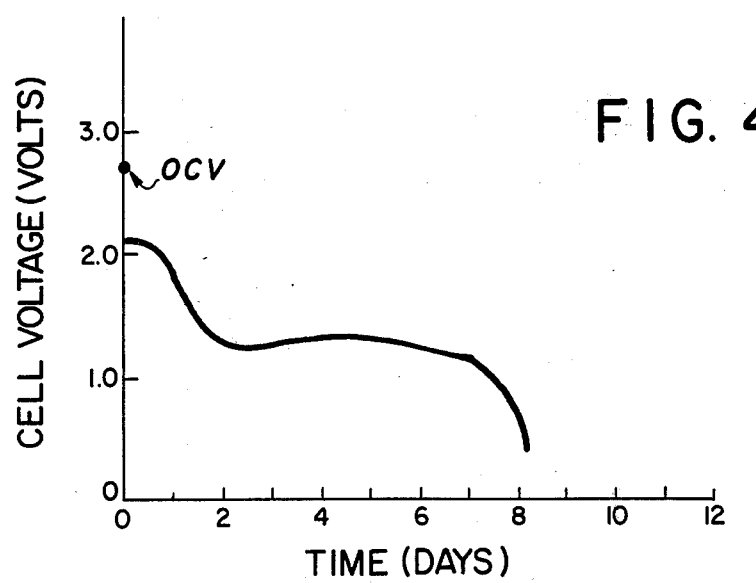
FIG. 4 is a curve showing the discharge characteristics of a non-aqueous lead oxide-lithium cell employing a positive electrode composed of lead dioxide particles and an electrolyte containing hydrazine for surface reduction of the lead dioxide particles in accordance with the present invention.

The cell so produced in accordance with this invention was then discharged across a 2.4K-ohm load (about 0.6 milliampere drain) and the voltage observed as a function of time is shown plotted as the curve on the graph in FIG. 4. Also observed and as recorded on FIG. 4 is the open circuit voltage of the cell which was about 2.7 volts.

The curve in FIG. 4 shows that the cell discharged at a substantially unipotential level after about 2 days at this very low drain and then continued at the lead monoxide-lithium voltage level until the cathode was exhausted after the 7th day. Although the test results of the cell using this method of reducing $PbO_2$ were not as good as the test results of the cell using the method disclosed in Example III, the disclosed method does demonstrate that it can be employed to make a non-aqueous lead dioxide cell which takes advantage of the high capacity characteristic of lead dioxide while simultaneously effectively eliminating the disadvantage of the dual voltage level output characteristic of lead dioxide in a non-aqueous cell system.

It is to be understood that other modifications and changes to the preferred embodiments of the invention herein shown and described can also be made without departing from the spirit and scope of the invention.

What is claimed is:

1. A lead oxide cell comprising a highly active metal negative electrode, a positive electrode and a non-aqueous electrolyte comprising a salt dissolved in an organic solvent; said positive electrode comprising lead dioxide particles having a substantially complete outer layer of lead monoxide, and said cell having a substantially unipotential discharge voltage.

2. The lead oxide cell of claim 1 wherein the lead monoxide layer on the lead dioxide particles varies between about 1 percent and about 60 percent based on the weight of the lead oxides.

3. The lead oxide cell of claim 1 wherein said lead dioxide particles having a substantially complete outer layer of lead monoxide vary between about 0.4 mm and about 0.47 mm.

4. The lead oxide cell of claim 3 wherein the lead monoxide layer on the lead dioxide particles varies between about 1 percent and about 60 percent based on the weight of the lead oxides.

5. The lead oxide cell of claim 1 wherein the active metal negative electrode is selected from the group consisting of aluminum, the alkali metals alkaline earth metals and alloys thereof.

6. The lead oxide cell of claim 5 wherein the active metal negative electrode is selected from the group consisting of lithium, sodium, potassium, calcium and alloys thereof.

7. The lead oxide cell of claim 6 wherein the active metal negative electrode is lithium.

8. The lead oxide cell of claim 1 wherein the solute of the electrolyte is a complex salt of a Lewis acid and an inorganic ionizable salt.

9. The lead oxide cell of claim 1 wherein the solvent of the electrolyte is at least one solvent selected from the group consisting of sulfolane, crotonitrile, nitrobenzene, tetrahydrofuran, 1,3-dioxolane, 3-methyl-2-oxazolidone, propylene carbonate, γ-butyrolactone, ethylene glycol sulfite, dimethylsulfite, dimethyl sulfoxide, 1,1- and 1,2-dimethoxyethane, and dimethyl isoxazole.

10. The lead oxide cell of claim 8 wherein said at least one solvent is selected from the group consisting of sulfolane, 3-methyl-2-oxazolidone, propylene carbonate, 1,3-dioxolane, and dimethoxyethane.

* * * * *